United States Patent Office 3,553,592
Patented Jan. 5, 1971

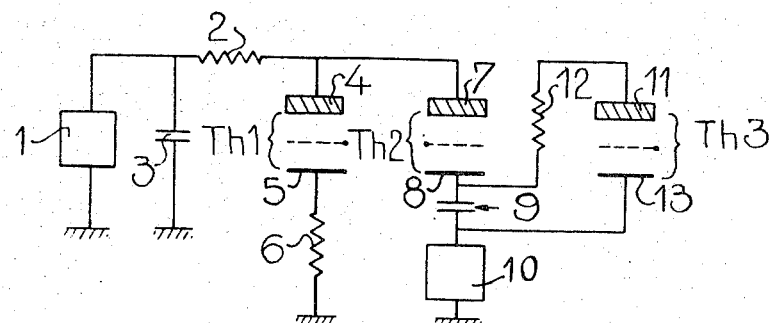
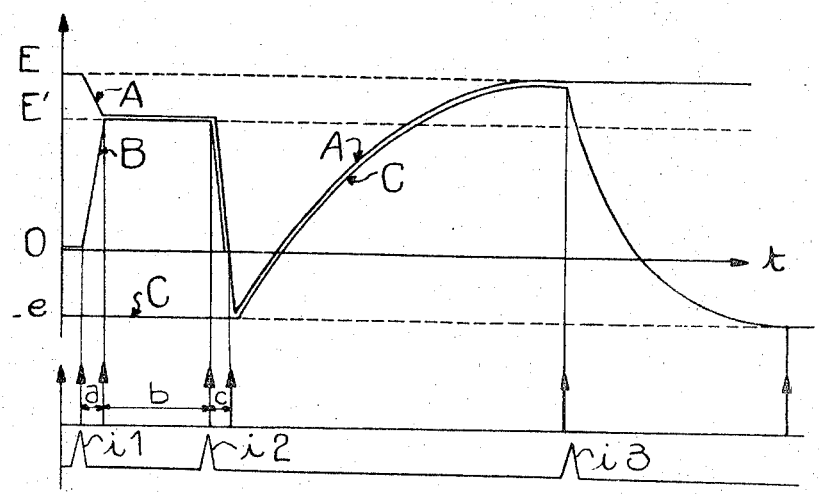

3,553,592
GENERATOR FOR RECTANGULAR ELECTRICAL PULSES
Michel Ahrweiller, Palaiseau, France, assignor to Commissariat a l'Energie Atomique, Paris, France
Filed Nov. 8, 1967, Ser. No. 681,350
Claims priority, application France, Nov. 23, 1966, 84,712
Int. Cl. H03k 1/00
U.S. Cl. 328—67                                 7 Claims

ABSTRACT OF THE DISCLOSURE

A rectangular pulse generator having a direct current source, a load mounted in series with a first gas-filled or semi-conducting thyratron and connected across the source, a reblocking circuit for the first thyratron connected in parallel with the first thyratron and the load, and a second thyratron connected in series with a transient response element connected in the reblocking circuit of the first thyratron.

---

The present invention relates to a generator of rectangular electrical pulses, more particularly used for the ionisation of certain gases with the object of obtaining plasmas.

Several methods of obtaining rectangular pulses are already known. For example when the energy to be liberated in the form of pulses is sufficiently small, a direct current distribution system can be used as the energy source since this can provide the energy required in this case. The generator then comprises a switch connecting the system to the load in question and then disconnecting it. This switch, in the simplest devices, is constituted by a triode, to the grid of which are applied control pulses, the load being inserted in the cathode circuit (cathode-follower assembly).

When the energy required increases, vacuum tubes are no longer suitable and gas filled or semi-conductor thyratrons are used as switches. Then again the current must pass through a reservoir element intended to store the energy and to restore it rapidly during the relatively short duration of the pulse; this reservoir element can be a condenser or a delay line.

The use of a condenser in such pulse generators has the major drawback that it does not give a truly rectangular pulse since, during discharging of the condenser, the voltage across the latter decreases. A condenser thus has to be provided of such size that the amount of voltage drop during the duration of the pulse is negligible.

Moreover, when the energy to be liberated increases, dimensions of the condenser must be increased. For the reasons given above the latter can take on prohibitive proportions. In this case, the condenser can be replaced by a delay line which after having been previously charged, is discharged by means of a thyratron into the load, the cutting off of the thyratron occurring by itself when the delay line is completely discharged. The duration of the pulse thus obtained is equal to or double the time of propagation of the wave front in the delay line.

Unfortunately, the discharging of the delay line only produces a rectangular pulse if the load has an impedance equal to the characteristic impedance of the delay line; if not, reflections are produced which give the pulse a stepped profile for example.

The generators made according to this principle have certain disadvantages. In effect, when it is desired to use these generators to ionise plasmas, the load constituted by these plasmas is variable as a function of time: It is therefore necessary if it is desired to have convenient matching between the load impedance and the impedance of the delay line with a view to obtaining rectangular pulses, to connect in parallel with the load a low impedance, and this causes low energy yield.

Moreover, since the delay line is composed of a finite number of delay cells, it is only possible to vary the length of the pulse by sudden steps.

An object of the present invention is to minimize or eliminate these disadvantages by providing a generator enabling rectangular pulses to be obtained, the voltage and current characteristics of which can be widely varied and of which the duration is adjustable in continuous fashion within a wide range.

According to the invention, a rectangular pulse generator comprises direct current source, a load mounted in series with a first gas filled or semi-conductor thyratron and connected across the said source, a reblocking circuit for the first thyratron mounted in parallel with the latter and the load, and including a second gas filled or semi-conductor thyratron, the reblocking circuit of the first thyratron including a transient response element mounted in series with the second thyratron.

The reblocking circuit may comprise in addition an auxiliary source of direct current connected in series with the said transient response element with its negative pole connected to the element.

The reblocking circuit may have moreover a circuit connected across the transient response element and constituted by a third gas filled or semi-conductor thyratron connected in series with a resistance.

In order that the invention may be more fully understood, various embodiments in accordance therewith will now be described, by way of example, with reference to the accompanying drawings in which:

FIG. 1 is a circuit diagram of a first embodiment of pulse generator.

FIG. 2 is an operating diagram showing a complete cycle of operation of the generator of FIG. 1.

Figure 3:
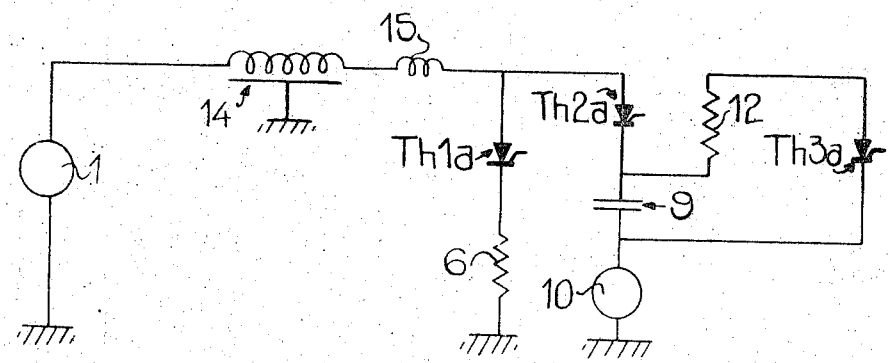
FIG. 3 is a circuit diagram of a second embodiment of pulse generator.

Referring to FIG. 1, the pulse generator comprises a source 1 of direct current, of which the negative pole is connected to earth and the positive pole is connected through a reservoir element to the anode 4 of a thyratron $Th1$ whose cathode 5 is connected to earth through a load resistance 6 constituted in this embodiment by a plasma. The reservoir element comprises a reservoir condenser 3 connected across the source 1, together with a resistance 2.

In parallel with the thyratron $Th1$ and the load 6 is connected a cut-off circuit for the thyratron $Th1$ constituted by a second thyratron $Th2$ whose anode 7 is connected to the anode 4 of the thyratron $Th1$ and whose cathode 8 is connected to earth through a transient response element shown as a condenser 9 and an auxiliary source 10 of direct current connected in series with the condenser, the positive and negative poles of this source 10 being connected respectively to earth and to one of the plates of the condenser 9.

A third circuit called the discharge circuit of the condenser 9 is connected across this condenser and comprises a third thyratron $Th3$, the anode 11 of which is connected through a resistance 12 to the terminal of the condenser 9 common with the cathode 8 of the thyratron $Th2$ and of which the cathode 13 is connected to the other plate of the condenser 9.

The control circuits connected to the grids of the thyratron tubes $Th1$, $Th2$ and $Th3$ have not been shown.

The operation of the generator described above is as follows: FIG. 2 is the diagram of operation of the generator when a pulse is produced. The cycle for producing a pulse requires the successive firing of each of the thyratrons $Th1$, $Th2$ and $Th3$ and their cut-off and de-ionisation.

Initially, that is to say before any control pulse is applied to the grid of the thyratron $Th1$, the potential of the anode 4 of the thyratron $Th1$ (curve A) is equal to the potential E of the positive terminal of the source 1.

In the same way, the potential of the cathode 5 of the thyratron $Th1$ (curve B) is equal to the potential O of earth and the potential of the cathode 8 of the thyratron $Th2$ (curve C) is equal to the potential $-e$ of the negative terminal of the auxiliary source 10.

In the diagram of FIG. 2, the voltages are shown on the ordinate or Y-axis and the time is shown on the abscissa or X-axis.

When a control pulse ($i_1$) is applied to the grid of the thyratron $Th1$, the latter becomes conducting. The potentials of the anode 4 and cathode 5 of the thyratron $Th1$ become, at the end of a rise time $a$ of the pulse, substantially equal to a potential $E'$, between O and E. $E'$ is defined by the potentiometric ratio of the resistances 2 and 6, that of the thyratron being negligible. At the end of this time $a$, the constant voltage portion of the pulse of duration $b$ commences. At the end of the time $b$, a control pulse ($i_2$) is applied to the grid of the thyratron $Th2$ which becomes conducting.

The potential of the cathode 5 of the thyratron $Th1$ falls to zero at the end of a very short time $c$ of the same order of length as the time $a$ and remains there. The thyratron $Th1$ is then blocked. The potential of the anode 4 of the thyratron $Th1$ (that is to say the potential of the anode 7 of the thyratron $Th2$) falls to the potential of the cathode 8 of the thyratron $Th2$, that is to say to the potential $-e$ since the condenser 9 is not charged. The condenser 9 commences to charge, according to an exponential law which causes the potential of the cathode 8 (and consequently that of the anode 7) of the thyratron $Th2$ to rise as far as the potential E when the condenser 9 is charged.

The time constant of this exponential law is determined according to the choice of value of the capacity 9 and of the resistance 2 in such a way that the potential of the anode 4 of the thyratron $Th1$ remains below zero sufficiently long for the thyratron $Th1$ to be deionised. In the same way, the potentials of the anode 7 and the cathode 8 of the thyratron $Th2$ remain substantially equal to the potential E and the current flowing in the thyratron $Th2$ is cancelled; this state is maintained sufficiently long for the thyratron $Th2$ to be deionised.

When the thyratron $Th2$ is deionised, a control pulse ($i_3$) is applied to the grid of the thyratron $Th3$ which becomes conducting. The potential of the cathode 8 of the thyratron $Th2$ falls according to an exponential curve to the potential $-e$ and remains there so as to cancel the current flowing in the thyratron $Th3$ and to deionise the latter; the condenser 9 is then discharged.

A complete cycle is thus accomplished and a new cycle producing a new pulse can be commenced. It should be noticed however that it is possible to apply the control pulse ($i_1$) to the thyratron $Th1$ even when the discharging of the condenser 9 is not finished, the essential requirement being that the thyratron $Th2$ should be blocked and deionised at the moment when the thyratron $Th1$ is rendered conducting.

The duration $b$ of the pulse is determined by the moment of application of the control pulse ($i_2$) to the thyratron $Th2$.

The rise time $a$ of the pulse is of the order of half a micro-second and is determined particularly by the dimensions of the condenser 3 and by the stray capacities of the circuit; the falling time is of the order of a microsecond and the duration of the pulse can vary from a few micro-seconds to several tens of milli-seconds. As to the intensity of the pulses, this can be varied from a few milliamperes to several tens of amperes. If it is desired to obtain even higher intensities, of the order of several hundred amperes, the resistance 2 can be replaced by an inductance, the thyratrons $Th1$, $Th2$, $Th3$ by thyristors and the condenser 3 by a delay line for example in order to avoid prohibitive values of the condenser.

Such an embodiment of pulse generator is shown in FIG. 3 in this embodiment, the positive pole of the source 1 of continuous current is connected to the anode of the thyristor $Th1a$, through a delay line 14 and an inductance 15.

As in FIG. 1, the control circuits for the thyristors $Th1a$, $Th2a$, $Th3a$ are not shown.

The operation of this circuit is the same as that of the generator of FIG. 1.

The rise time $a$ of the pulse is in this case of the order of ten micro-seconds and is determined by the value of the impedances of the delay line 14, of the inductance 15 and of the load 6, the impedance of these elements being equally determined with the object of having the desired damping in the oscillator circuit constituted by the elements. The duration of the pulse obtained is of the order of a few milliseconds with an intensity of several hundred amperes.

Figure 4:
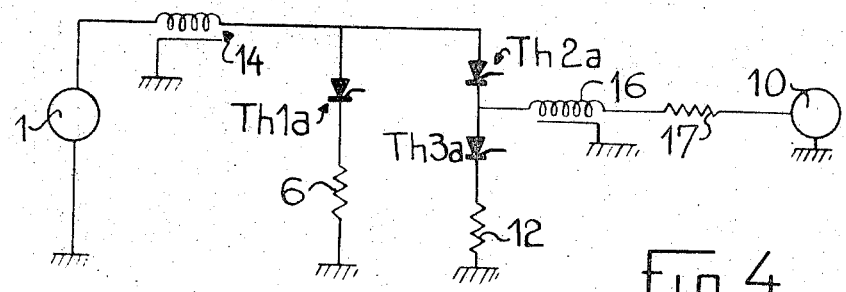
FIG. 4 is a circuit diagram of a third embodiment of pulse generator.

In the case where a more rapid rise time $a$ of the pulse is desired, the inductance 15 is removed and the condenser 9 is replaced by a second delay line. This embodiment is shown in FIG. 4 in which are to be found the essentials of the elements of FIG. 3. The transient response condenser has been replaced by a transient response delay line 16 having an impedance equal to that of the resistance 12 and connected on the one hand to the cathode of the thyristor $Th2a$ and to the negative terminal of the auxiliary source 10 through a resistor 17 and on the other hand to earth. The cathode of the thyristor $Th3a$ is also connected to earth through the resistor 12.

Figure 5:
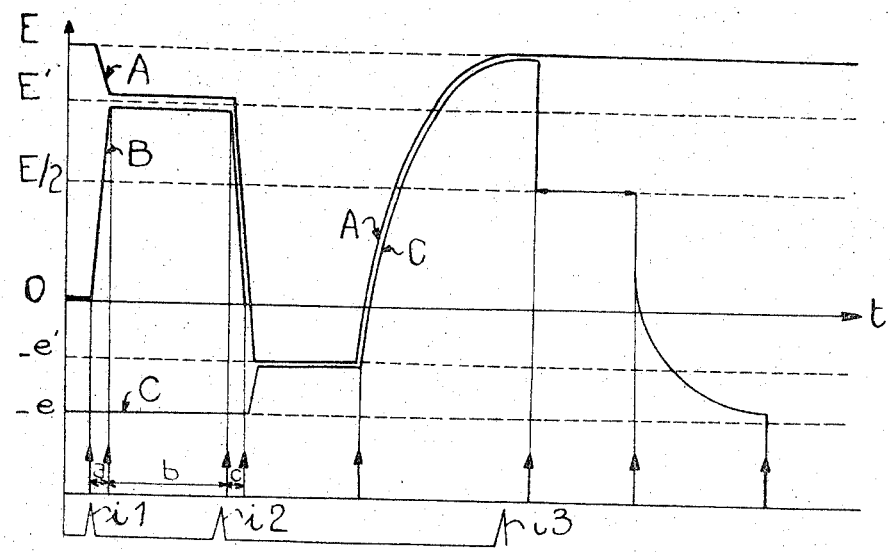
FIG. 5 is a diagram showing a full cycle of operation of the generator of FIG. 4.

The operation of this embodiment of generator is as follows (FIG. 5): until the moment of application of the control pulse ($i_2$) to the second thyristor $Th2a$, the operation is identical with that of the generator shown in FIG. 1. When the thyristor $Th2a$ is rendered conducting the potential (curve B) of the cathode of the thyristor $Th1a$ falls to zero and remains there blocking the thyristor $Th1a$ and the potential (curve A) of the anodes of the thyristors $Th1a$ and $Th2a$ fall below zero and are stabilized at a value $-e'$ which is between the potential $-e$ of the negative terminal of the auxiliary source 10 and the potential zero of earth.

At the same time, the potential (curve C) of the cathode of the thyristor $Th2a$ assumes this same value $-e'$ during a certain time interval equal to twice the propagation time in the delay line 16; during this time, the thyristor $Th1a$ is deionised. Then the delay line 16 is charged according to an exponential curve. The potentials of the anode and cathode of the thyristor $Th2a$ rise simultaneously up to the value E at which the thyristor $Th2a$ is blocked and stabilized sufficiently long to become deionised. After this, a control pulse ($i_3$) is applied to the thyristor $Th3a$ which becomes conducting. The potential (curve C) of the cathode of the thyristor $Th2a$ falls to the value $E/2$ since the impedances of the resistance 12 and the delay line 16 are equal, and is stabilized at this level during an interval of time equal to double the propagation time in the delay line 16. Then the delay line discharges and the potential of the cathode of the thyristor $Th2a$ becomes once more $-e$ which causes the blocking and then the deionisation of the thyristor $Th3a$.

In this third embodiment pulses are obtained having a duration of between about ten microseconds and several milliseconds with a rise time $a$ of a few microseconds and an intensity of the order of several hundred amperes.

In the three embodiments described above, the auxiliary source 10 of direct current is not absolutely essential, its particular role being to make deionisation of the thyratron (or thyristor) $Th1$ more powerful, easier and more rapid.

It is also possible to envisage a reblocking circuit for the gas filled or semi-conductor thyratron (Th1 or Th1a) which only comprises the thyratron (Th2 or Th2a) in series with the transient response element condenser 9 or delay (line 16), the essential being that the terminal of this element connected to the cathode of the thyratron (Th2 or Th2a) remains, when the latter is conducting, at a potential below the refiring potential of the thyratron (Th1 or Th1a) sufficiently long for the thyratron (Th1 or Th1a) to become deionised.

Again, the third thyratron (or thyristor) Th3 which serves to place the generator assembly back in its initial state, essentially enables the pulse generator to operate on a repeating basis.

What is claimed is:

1. A rectangular pulse generator comprising a direct current source, a first thyratron, a load connected in series with said first thyratron and connected across the source, a reblocking circuit for said first thyatron including a transient response element connected in parallel with the first thyratron and the load, a second thyratron connected in series with the transient response element and a third thyratron connected in series with a resistance being connected in parallel across the transient response element.

2. A pulse generator according to claim 1 wherein said reblocking circuit for said first thyratron includes an auxiliary source of direct current connected in series with said transient response element.

3. A pulse generator according to claim 2 wherein said transient response element is a condenser.

4. A generator according to claim 2 wherein said transient response element is a delay line.

5. A generator according to claim 1 wherein a reservoir condenser is connected between the load and the direct current source.

6. A generator according to claim 1 wherein a reservoir delay line is connected between the load and said direct current source.

7. A generator according to claim 1 wherein a reservoir delay line is connected through an inductance to the anodes of said two thyratrons.

References Cited

UNITED STATES PATENTS

| | | | |
|---|---|---|---|
| 2,490,562 | 12/1949 | Van Dorsten | 315—340X |
| 2,537,383 | 1/1951 | Van Dorsten | 315—340X |
| 2,549,654 | 4/1951 | Wittenberg | 315—340X |
| 2,575,559 | 11/1951 | Parkinson | 328—67 |
| 2,698,900 | 1/1955 | Anger | 328—67 |
| 3,049,642 | 8/1962 | Quinn | 307—252X |
| 3,139,585 | 6/1964 | Ross et al. | 328—67X |
| 3,079,514 | 2/1963 | Fischman | 307—284X |
| 3,431,436 | 3/1969 | King | 307—25F |

DONALD D. FORRER, Primary Examiner

R. C. WOODBRIDGE, Assistant Examiner

U.S. Cl. X.R.

307—252; 315—340